(12) United States Patent
Tsubuku et al.

(10) Patent No.: US 9,657,173 B2
(45) Date of Patent: May 23, 2017

(54) CURABLE RESIN COMPOSITION AND CURED PRODUCT THEREOF

(75) Inventors: Makoto Tsubuku, Niigata (JP); Taketo Ikeno, Niigata (JP); Masayuki Katagiri, Niigata (JP); Tomoo Tsujimoto, Niigata (JP)

(73) Assignee: MITSUBISHI GAS CHEMICAL COMPANY, INC., Chiyoda-Ku (JP)

( * ) Notice: Subject to any disclaimer, the term of this patent is extended or adjusted under 35 U.S.C. 154(b) by 742 days.

(21) Appl. No.: 13/978,310

(22) PCT Filed: Jan. 31, 2012

(86) PCT No.: PCT/JP2012/052127
§ 371 (c)(1),
(2), (4) Date: Jul. 3, 2013

(87) PCT Pub. No.: WO2012/105547
PCT Pub. Date: Aug. 9, 2012

(65) Prior Publication Data
US 2013/0288063 A1    Oct. 31, 2013

(30) Foreign Application Priority Data
Feb. 4, 2011    (JP) ................................. 2011-022763

(51) Int. Cl.
*C08K 5/34* (2006.01)
*C08K 5/00* (2006.01)
(Continued)

(52) U.S. Cl.
CPC ............. *C08L 75/06* (2013.01); *C08G 59/08* (2013.01); *C08G 59/4014* (2013.01);
(Continued)

(58) Field of Classification Search
CPC ............. C08G 73/0655; C08G 59/08; C08G 59/4014; C08L 79/04; C08L 75/06;
(Continued)

(56) References Cited

U.S. PATENT DOCUMENTS 3,553,244 A    1/1971    Grigat et al.
4,709,008 A    11/1987    Shimip
(Continued)

FOREIGN PATENT DOCUMENTS

CN    101283022    10/2008
JP    54-30440    10/1979
(Continued)

OTHER PUBLICATIONS

Professional translation of JP 3278753 B2, retrieved Dec. 22, 2015.*
(Continued)

*Primary Examiner* — David Karst
(74) *Attorney, Agent, or Firm* — Greenblum & Bernstein, P.L.C.

(57) ABSTRACT

A curable resin composition which can achieve a cured product in which the generation of cracks upon curing is suppressed and which has both a low thermal expansion rate and a low water absorbability is provided. The curable resin composition comprises: at least a cyanate ester compound (A) represented by the following formula (I); a metal complex catalyst (B); and an additive (C), wherein the additive (C) contains any one or more selected from the group consisting of a compound represented by the following general formula (II), a compound represented by the following general formula (III), and a tertiary amine.

[Formula 1]

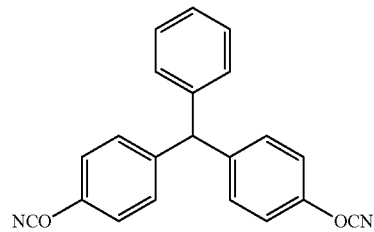

(I)

18 Claims, 6 Drawing Sheets

(51) Int. Cl.

| | | |
|---|---|---|
| *C08G 59/42* | (2006.01) | |
| *C08L 75/06* | (2006.01) | |
| *C08G 73/06* | (2006.01) | |
| *C08L 79/04* | (2006.01) | |
| *C09J 179/04* | (2006.01) | |
| *C08G 59/08* | (2006.01) | |
| *C08G 59/40* | (2006.01) | |
| *C08J 5/24* | (2006.01) | |
| *C09K 3/10* | (2006.01) | |

(52) U.S. Cl.
CPC ............ *C08G 73/0655* (2013.01); *C08J 5/24* (2013.01); *C08L 79/04* (2013.01); *C09J 179/04* (2013.01); *C09K 3/1006* (2013.01); *C08J 2363/00* (2013.01); *C08J 2379/04* (2013.01); *C09K 2200/0645* (2013.01); *Y10T 428/31678* (2015.04)

(58) Field of Classification Search
CPC ... C09J 179/04; Y10T 428/31678; C08J 5/24; C08J 2363/00; C08J 2379/04; C09K 3/1006; C09K 2200/0645
USPC ......... 428/457; 523/456; 524/251, 324, 352, 524/92, 99
See application file for complete search history.

(56) References Cited

U.S. PATENT DOCUMENTS

| | | | |
|---|---|---|---|
| 5,756,592 A | 5/1998 | Bedwell | |
| 6,121,484 A | 9/2000 | Falchetto | |
| 6,380,344 B1 * | 4/2002 | Hayashi | C08G 18/10 156/331.7 |
| 2009/0130488 A1 | 5/2009 | Sugano et al. | |

FOREIGN PATENT DOCUMENTS

| | | |
|---|---|---|
| JP | 63-22821 | 1/1988 |
| JP | 04-221355 | 8/1992 |
| JP | 5-301852 | 11/1993 |
| JP | 6-73177 | 3/1994 |
| JP | 07-53497 | 2/1995 |
| JP | 11-124433 | 5/1999 |
| JP | 2991054 | 10/1999 |
| JP | 2000-501138 | 2/2000 |
| JP | 2001-504835 | 4/2001 |
| JP | 3278753 B2 * | 4/2002 |
| JP | 2006-143874 | 6/2006 |
| JP | 2006-169317 | 6/2006 |
| JP | 2006-193607 | 7/2006 |
| JP | 2006-290933 | 10/2006 |
| JP | 2007-277102 | 10/2007 |
| JP | 2009-096874 | 5/2009 |

OTHER PUBLICATIONS

Ueno et al., JP 2006-290933 A machine translation in English, Oct. 26, 2006.*

Korshak V V et al., "Effect of the structure of polycyanates prepared by polycyclotrimerization of aryl dicyanates on their thermal stability", Polymer Science U.S.S.R, Pergamon Press, Oxford, vol. 17, No. 3, Jan. 1, 1975 (Jan. 1, 1975), pp. 554-559.

English language version of International Search Report issued in PCT/JP2012/052127 on May 1, 2012.

Ian Hamerton, "Chemistry and Technology of Cyanate Ester Resins", Ch. 2 "The synthesis, manufacture and carackterizaiton of cyanate ester monomers" A.W. Snow, Blackie Academic & Professional , pp. 6-57, 1994.

* cited by examiner

CURABLE RESIN COMPOSITION AND CURED PRODUCT THEREOF

TECHNICAL FIELD

The present invention relates to a curable resin composition. More particularly, the present invention relates to a curable resin composition with which the generation of cracks upon curing is suppressed and a thermal expansion rate and water absorption rate of a cured product can be improved, and a cured product thereof.

BACKGROUND ART

In recent years, there have been many electronic devices featured by keywords of light, thin, short, and compact, such as a mobile phone, an ultraslim liquid crystal TV and a plasma TV, and a lightweight notebook computer in the field of a semiconductor-related material. The high-density integration and high-density packaging or the like of electronic parts used therefor are progressing. Therefore, size reduction and higher density are required for a printed-wiring board or the like corresponding to the high-density packaging used for these electronic parts than ever before.

A multilayer printed-wiring board produced by a buildup system is often employed for the high density of the printed-wiring board. A thermosetting resin composition represented by an epoxy resin is ordinarily used for an insulating layer thereof. However, the thermosetting resin has a problem of internal stress accumulation caused by a decrease in free volume upon curing. Therefore, when the thermosetting resin is used as an insulating material of the printed-wiring board, cracks and warps may be generated in a molded product by cure shrinkage, and the reliability of the printed-wiring board may be decreased by the accumulation of internal distortion. Therefore, a curable resin composition having little accumulation of internal stress upon curing and generating few cracks has been aspired.

Because a mounting temperature is a high temperature of 250° C. or higher in a process of mounting a semiconductor device in a multilayer printed-wiring board when a semiconductor apparatus is produced after the curing of the resin, the warp of the multilayer printed-wiring board may be increased upon mounting. The moisture absorption of the resin is known to further increase the degree of the warp. Therefore, a resin composition generating few cracks upon curing and having an excellent low thermal expansibility and low water absorbability has been required.

Meanwhile, a cyanate ester resin has been known as a thermosetting resin having excellent heat resistance, a low dielectric constant, and low dielectric loss. Particularly, a resin composition using a bisphenol A-based cyanate ester resin and a bismaleimide compound in combination, as proposed in Japanese Patent Publication No. 54-30440 (Patent Literature 1), is referred to as a "BT resin." The BT resin has an excellent electrical property, mechanical property, and chemical resistance or the like, and is used for an insulating layer of a multilayer wiring board. However, although the resin composition containing the bisphenol A-based cyanate ester resin has an excellent electrical property, mechanical property, and chemical resistance, the resin composition has a high water absorption rate. A further improvement in heat resistance or thermal expansibility of the resin composition has been required, and the development of cyanate ester resins having other structures has progressed.

For example, a novolac-based cyanate ester resin has been proposed in Japanese Patent Laid-Open No. 11-124433 (Patent Literature 2). However, a cured product using the novolac-based cyanate ester resin has a water absorption rate greater than that of the BT resin, which may lower heat resistance in moisture absorption.

Japanese Patent Laid-Open No. 2006-169317 (Patent Literature 3) discloses that a resin cured product using a triphenylmethane-based cyanate ester compound and a bismaleimide compound in combination has an excellent thermal expansibility. Furthermore, Japanese Patent Laid-Open No. 2006-143874 (Patent Literature 4) discloses that a resin cured product using a triphenylmethane-based cyanate ester compound and a novolac-based cyanate ester compound in combination has excellent water absorbability.

CITATION LIST

Patent Literature

Patent Literature 1: Japanese Patent Publication No. 54-30440
Patent Literature 2: Japanese Patent Laid-Open No. 11-124433
Patent Literature 3: Japanese Patent Laid-Open No. 2006-169317
Patent Literature 4: Japanese Patent Laid-Open No. 2006-143874

SUMMARY OF INVENTION

However, the cured product using the resin proposed in Japanese Patent Laid-Open No. 11-124433 has a water absorption rate greater than that of the BT resin, which may lower heat resistance in moisture absorption. Then, although the resin cured product using the resin proposed in Japanese Patent Laid-Open No. 2006-169317 has an excellent thermal expansibility, the water absorbability of the resin cured product thereof is not considered. Furthermore, the resin cured product using the resin proposed in Japanese Patent Laid-Open No. 2006-143874 has an insufficient thermal expansibility, and there is room for an improvement also in the water absorbability of the resin cured product thereof.

The present inventors found that a cured product in which the generation of cracks upon curing is suppressed and which has both a low thermal expansion rate and a low water absorbability can be realized by using a specific bifunctional cyanate ester compound, a metal complex catalyst, and a specific additive in combination. The present invention is based on this finding.

Therefore, it is an object of the present invention to provide a curable resin composition which can achieve a cured product in which the generation of cracks upon curing is suppressed and which has both a low thermal expansion rate and a low water absorbability.

A cyanate ester compound according to the present invention comprises:

at least a cyanate ester compound (A) represented by the following formula (I):

[Formula 1]

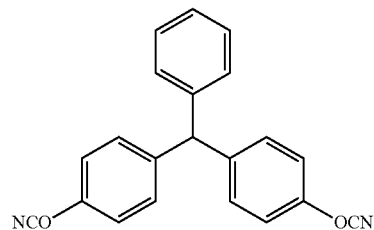

a metal complex catalyst (B); and
an additive (C),
wherein the additive (C) comprises any one or more selected from the group consisting of a compound represented by the following general formula (II), a compound represented by the following general formula (III), and a tertiary amine:

[Formula 2]

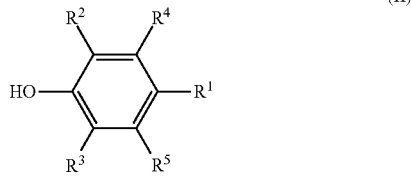

(II)

wherein $R^1$ to $R^5$ each independently represent a hydrogen atom, an alkyl group having 1 to 15 carbon atoms, or an aryl group having 6 to 12 carbon atoms, and at least one of $R^1$ to $R^5$ is an alkyl group having 1 or more carbon atoms or an aryl group having 6 or more carbon atoms, and

[Formula 3]

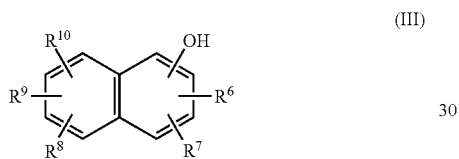

(III)

wherein $R^6$ to $R^{10}$ each independently represent a hydrogen atom, an alkyl group having 1 to 4 carbon atoms, an alkoxy group having 1 to 4 carbon atoms, an aryl group having 6 to 15 carbon atoms, or a hydroxy group.

In another aspect of the present invention, there is also provided a cured product obtained by curing the curable resin composition.

In another aspect of the present invention, there is also provided a sealing material comprising the curable resin composition.

In another aspect of the present invention, there is also provided an adhesive comprising the curable resin composition.

In another aspect of the present invention, there is also provided a casting material comprising the curable resin composition.

In another aspect of the present invention, there is also provided a prepreg comprising: a base material; and the curable resin composition impregnated into or coated on the base material.

In another aspect of the present invention, there is also provided a laminated sheet obtained by stacking at least one prepreg, disposing a metal foil on one side or both sides of the prepreg or the stacked prepregs and, laminate-molding the metal foil and the prepreg or the stacked prepregs.

According to the present invention, a .cured product in which the generation of cracks upon curing is suppressed and which has both a low thermal expansion rate and a low water absorbability can be realized by the curable resin composition using the specific bifunctional cyanate ester compound, the metal complex catalyst, and the specific additive in combination as described above.

DESCRIPTION OF EMBODIMENT

<Curable Resin Composition>

Figure 1:
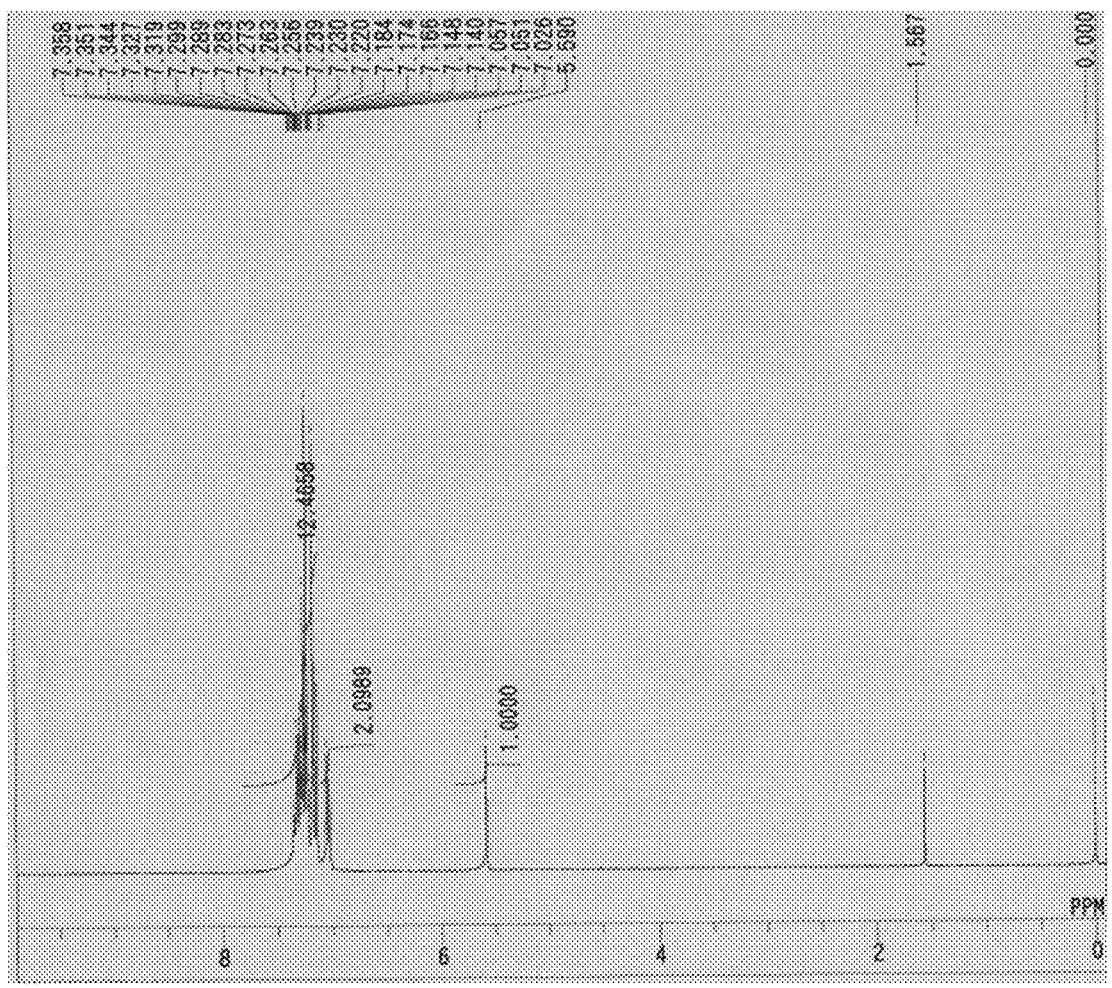
FIG. 1 is a $^1$H-NMR chart of bis(4-cyanatophenyl)phenylmethane obtained in Synthesis Example 1.

A curable resin composition according to the present invention contains a specific cyanate ester compound (A), a metal complex catalyst (B), and a specific additive (C) as indispensable ingredients. Hereinafter, individual ingredients will be described.

<Cyanate Ester Compound (A)>

The cyanate ester compound (A) contained in the curable resin composition according to the present invention is represented by the following formula (I):

[Formula 4]

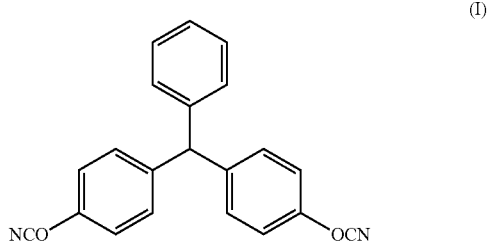

(I)

Because the curable resin composition containing bis(4-cyanatophenyl)phenylmethane represented by the formula (I) as the cyanate ester compound provides a cured product having a lower water absorbability and a lower coefficient of linear expansion even under a high temperature environment than that of a resin composition containing other cyanate ester, the curable resin composition can be used as a resin for an insulating layer of a high-density multilayer printed-wiring board. Above all, a cast product in which cure shrinkage is suppressed to prevent the generation of the cracks and having a good appearance can be obtained by using the metal complex catalyst and the additive to be described later in combination.

A method for producing the cyanate ester compound represented by the formula (I) is not particularly limited. A desired compound can be obtained by applying a method known as a cyanate synthesis method from a phenol represented by the following formula (VIII).

[Formula 5]

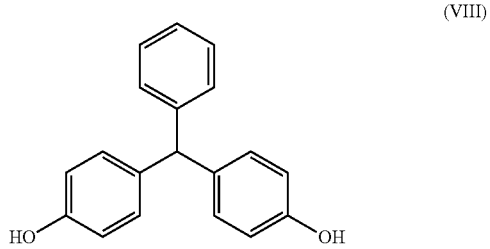

(VIII)

For example, the cyanate ester compound of the formula (I) can be obtained by cyanation of the phenol of the formula (VIII) according to a method described in IAN HAMERTON, "Chemistry and Technology of Cyanate Ester Resins," BLACKIE ACADEMIC & PROFESSIONAL. The above cyanate ester compound can be produced by known methods such as a method in which a phenol compound is reacted with a cyanogen halide in a solvent in the presence of a base in such a state that the cyanogen halide is always present in excess over the base (U.S. Pat. No. 3,553,244); a method in which a cyanate ester compound is synthesized using a tertiary amine as a base in excess over a cyanogen halide (Japanese Patent Laid-Open No. 7-53497); a method in which a trialkylamine is reacted with a cyanogen halide by a continuous plug flow system (National Publication of International Patent Application No. 2000-501138); a method in which a phenol is reacted with a cyanogen halide in an nonaqueous solution in the presence of a tert-amine and a tert-ammonium halide produced as a by-product in this reaction is treated with an cation/anion exchange pair (National Publication of International Patent Application No. 2001-504835); a method which includes reacting a phenol compound with a tertiary amine and a cyanogen halide by simultaneous addition of the tertiary amine and the cyanogen halide in the presence of a solvent separable from water, conducting water washing and separation of the product solution, and purifying the resulting solution by precipitation using secondary or tertiary alcohols or poor solvents for hydrocarbons (Japanese Patent No. 2991054); and a method in which naphthols, a cyanogen halide, and a tertiary amine are reacted in a two-phase solvent composed of water and an organic solvent under acidic conditions (Japanese Patent Laid-Open No. 2007-277102). The cyanate ester compound obtained by the above methods can be identified by known methods such as NMR.

<Metal Complex Catalyst (B)>

The metal complex catalyst (B) contained in the curable resin composition according to the present invention has a function for catalyzing the polymerization of the above cyanate ester compound or the like. Any conventionally known metal complex catalyst can be used as the metal complex catalyst (B). Examples thereof include organometallic salts such as Zn, Cu, Fe, Co, Mn, and Al of organic acids such as octylic acid, stearic acid, acetylacetonate, naphthenic acid, and salicylic acid. Among them, zinc octoate, copper octoate, cobalt octoate, aluminum octoate, zinc stearate, copper stearate, cobalt stearate, aluminum stearate, zinc acetylacetonate, copper acetylacetonate, iron acetylacetonate, manganese acetylacetonate, cobalt acetylacetonate, aluminum acetylacetonate, zinc naphthenate, copper naphthenate, cobalt naphthenate, and aluminum naphthenate are preferable, and zinc octoate, copper octoate, cobalt octoate, zinc stearate, cobalt stearate, zinc acetylacetonate, copper acetylacetonate, manganese acetylacetonate, cobalt acetylacetonate, zinc naphthenate, copper naphthenate, cobalt naphthenate, and aluminum naphthenate are more preferable. These metal complex catalysts may be used singly or in the form of a mixture of two or more. The curing temperature of the curable resin composition can be lowered by adding the metal complex catalyst (B).

The content of the metal complex catalyst (B) is preferably in the range of from 0.01 to 5 parts by mass based on 100 parts by mass of the cyanate ester compound (A). A cured product having excellent heat resistance even at a lower temperature curing condition can be obtained by containing the metal complex catalyst (B) in the range.

<Additive (C)>

The curable resin composition according to the present invention contains any one or more additives (C) selected from the group consisting of a compound represented by the following general formula (II), a compound represented by the following general formula (III), and a tertiary amine.

[Formula 6]

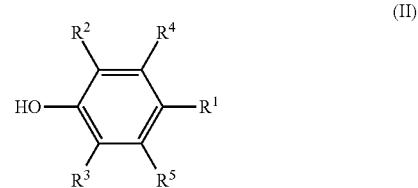

wherein $R^1$ to $R^5$ each independently represent a hydrogen atom, an alkyl group having 1 to 15 carbon atoms, or an aryl group having 6 to 12 carbon atoms, and at least one of $R^1$ to $R^5$ is an alkyl group having 1 or more carbon atoms or an aryl group having 6 or more carbon atoms; and

[Formula 7]

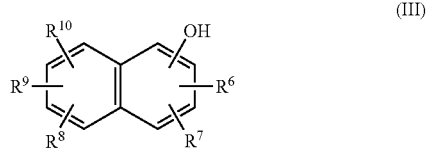

wherein $R^6$ to $R^{10}$ each independently represent a hydrogen atom, an alkyl group having 1 to 4 carbon atoms, an alkoxy group having 1 to 4 carbon atoms, an aryl group having 6 to 15 carbon atoms, or a hydroxy group.

Examples of the compound represented by the above general formula (II) include phenol compounds such as ethylphenol, butylphenol, octylphenol, nonylphenol, and 4-α-cumylphenol. Among them, butylphenol, octylphenol, nonylphenol, and 4-α-cumylphenol are preferable, and octylphenol and nonylphenol are more preferable. These compounds may be used singly or in the form of a mixture of two or more.

Examples of the compound represented by the general formula (III) include naphthalene compounds such as 1-naphthol, 2-naphthol, 4-methoxy-1-naphthol, 6-methyl-2-naphthol, 7-methoxy-2-naphthol, 2,2'-dihydroxy-1,1'-binaphthyl, 1,3-dihydroxynaphthalene, 1,4-dihydroxynaphthalene, 1,5-dihydroxynaphthalene, 1,6-dihydroxynaphthalene, 1,7-dihydroxynaphthalene, 2,3-dihydroxynaphthalene, 2,6-dihydroxynaphthalene, and 2,7-dihydroxynaphthalene. Among them, 1-naphthol, 4-methoxy-1-naphthol, 6-methyl-2-naphthol, 7-methoxy-2-naphthol, 2,2'-dihydroxy-1,1'-binaphthyl, 1,5-dihydroxynaphthalene, 1,6-dihydroxynaphthalene, 1,7-dihydroxynaphthalene, 2,6-dihydroxynaphthalene, and 2,7-dihydroxynaphthalene are preferable, and 1-naphthol, 1,6-dihydroxynaphthalene, 1,7-dihydroxynaphthalene, 2,6-dihydroxynaphthalene, and 2,7-dihydroxynaphthalene are more preferable. These compounds may be used singly or in the form of a mixture of two or more.

Furthermore, any known tertiary amine can be used as the tertiary amine without particular limitation. Examples thereof include triethylamine, tributylamine, N,N-diisopropylmethylamine, N,N-dicyclohexylmethylamine, N,N-dimethylaminoethanol, triethanolamine, tribenzylamine, N,N-dimethyl-4-methyl-benzylamine, 4-dimethylaminopyridine, N-methylpiperidine, N-methylmorpholine, N-methylhexamethyleneimine, N-(2-hydroxyethyl)hexamethyleneimine, 1,8-diazabicyclo[5.4.0]-7-undecene, 1,4-diazabicyclo[2.2.2]octane, and 3-quinuclidinone. Among them, tributylamine, N,N-diisopropylmethylamine, N,N-dicyclohexylmethylamine, N,N-dimethylaminoethanol, triethanolamine, 4-dimethylaminopyridine, N-methylmorpholine, N-methylhexamethyleneimine, and 1,8-diazabicyclo[5.4.0]-7-undecene are preferable, and tributylamine, N,N-dimethylaminoethanol, triethanolamine, 4-dimethylaminopyridine, and 1,8-diazabicyclo[5.4.0]-7-undecene are more preferable. These compounds may be used singly or in the form of a mixture of two or more.

The content of the additive (C) is preferably in the range of from 0.01 to 10 parts by mass based on 100 parts by mass of the cyanate ester compound (A). A curable resin composition which provides a cured product having a better appearance and has more excellent heat resistance can be provided by containing the additive (C) in the range.

< Other Ingredients>

In addition to the above cyanate ester compound (A), the curable resin composition according to the present invention may further contain another cyanate ester compound (D). Compounds represented by the following general formula (IV) to (VI) may be suitably used as the cyanate ester compound (D).

[Formula 8]

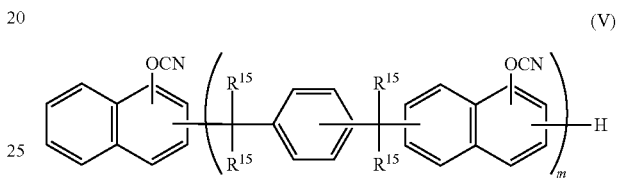

(IV)

wherein $R^{11}$ is any one selected from the group consisting of the following general formulae (i) to (vi):

[Formula 9]

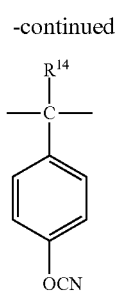

(i)

—S— (ii)

—O— (iii)

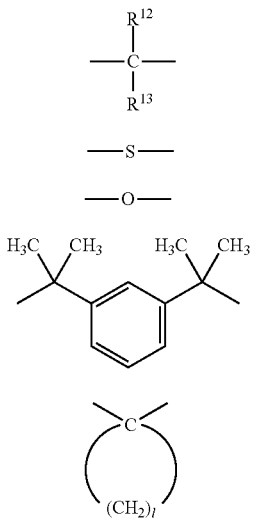

(iv)

(v)

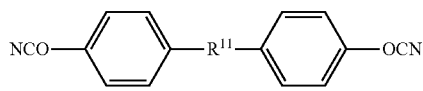

(vi)

wherein $R^{12}$, $R^{13}$, and $R^{14}$ are each independently a hydrogen atom, an alkyl group having 1 to 8 carbon atoms, or a trifluoromethyl group, and l is an integer of 4 to 7,

[Formula 10]

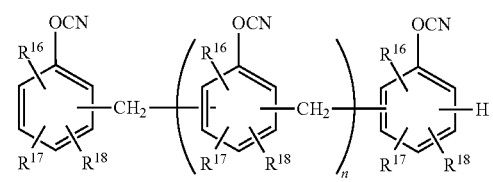

(V)

wherein $R^{15}$ represents a hydrogen atom or a methyl group, and m represents an integer of 1 to 50, and

[Formula 11]

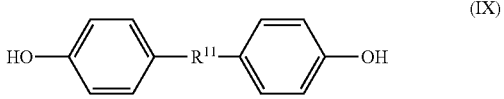

(VI)

wherein $R^{16}$ to $R^{18}$ are each independently a hydrogen atom, a methyl group, an ethyl group, a propyl group, a butyl group, or a phenyl group, and n represents an integer of 1 to 50.

The cyanate ester compound represented by the general formula (IV) can be obtained by cyanation of a phenol represented by the following general formula (IX) according to the same method as that of the above cyanate ester compound (A).

[Formula 12]

HO—⟨⟩—$R^{11}$—⟨⟩—OH (IX)

wherein $R^{11}$ is the same as the above definition.

The cyanate ester compound represented by the general formula (V) can be obtained by cyanation of a phenol represented by the following general formula (X) according to the same method as that of the above cyanate ester compound (A).

[Formula 13]

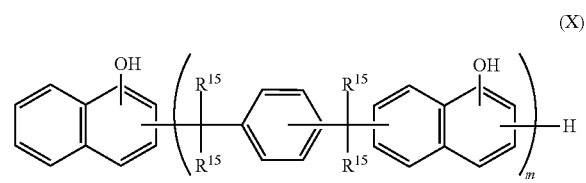

wherein $R^{15}$ and m are the same as the above definitions.

The cyanate ester compound represented by the general formula (VI) can be obtained by cyanation of a phenol represented by the following general formula (XI) according to the same method as that of the above cyanate ester compound (A).

[Formula 14]

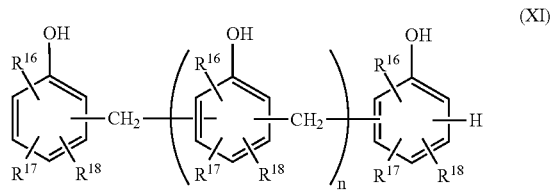

wherein $R^{16}$ to $R^{18}$ and n are the same as the above definitions.

Any commonly known cyanate ester compound can be used as the cyanate ester compound represented by the general formula (IV). Examples thereof include bis(4-cyanatophenyl)methane, 2,4'-dicyanatodiphenylmethane, 1,1-bis(4-cyanatophenyl)ethane, 1,1-bis(4-cyanatophenyl)propane, 2,2-bis(4-cyanatophenyl)propane, 1,1-bis(4-cyanatophenyl)-2-methylpropane, 1,1-bis(4-cyanatophenyl)butane, 1,1-bis(4-cyanatophenyl)pentane, 1,1-bis(4-cyanatophenyl)-3-methylbutane, 1,1-bis(4-cyanatophenyl)-2-methylbutane, 1,1-bis(4-cyanatophenyl)-2,2-dimethylpropane, 2,2-bis(4-cyanatophenyl)butane, 2,2-bis(4-cyanatophenyl)pentane, 2,2-bis(4-cyanatophenyl)hexane, 2,2-bis(4-cyanatophenyl)-3-methylbutane, 2,2-bis(4-cyanatophenyl)-4-methylpentane, 2,2-bis(4-cyanatophenyl)-3-methylpentane, 2,2-bis(4-cyanatophenyl)-3,3-dimethylbutane, 3,3-bis(4-cyanatophenyl)hexane, 3,3-bis(4-cyanatophenyl)heptane, 3,3-bis(4-cyanatophenyl)octane, 3,3-bis(4-cyanatophenyl)-2-methylpentane, 3,3-bis(4-cyanatophenyl)-2-methylhexane, 3,3-bis(4-cyanatophenyl)-2,2-dimethylpentane, 4,4-bis(4-cyanatophenyl)-3-methylheptane, 3,3-bis(4-cyanatophenyl)-2-methylheptane, 3,3-bis(4-cyanatophenyl)-2,2-dimethylhexane, 3,3-bis(4-cyanatophenyl)-2,4-dimethylhexane, 3,3-bis(4-cyanatophenyl)-2,2,4-trimethylpentane, 2,2-bis(4-cyanatophenyl)-1,1,1,3,3,3-hexafluoropropane, 1,3-bis[2-(4-cyanatophenyl)-2-propyl]benzene, bis(4-cyanatophenyl)ether, bis(4-cyanatophenyl)sulfide, 1,1-bis(4-cyanatophenyl)cyclopentane, and 1,1-bis(4-cyanatophenyl)cyclohexane. Among them, bis(4-cyanatophenyl)methane, 2,4'-dicyanatodiphenylmethane, 1,1-bis(4-cyanatophenyl)ethane, 1,1-bis(4-cyanatophenyl)propane, 2,2-bis(4-cyanatophenyl)propane, 1,1-bis(4-cyanatophenyl)-2-methylpropane, 1,1-bis(4-cyanatophenyl)butane, 2,2-bis(4-cyanatophenyl)butane, 2,2-bis(4-cyanatophenyl)hexane, 2,2-bis(4-cyanatophenyl)-4-methylpentane, 2,2-bis(4-cyanatophenyl)-3,3-dimethylbutane, 3,3-bis(4-cyanatophenyl)hexane, 3,3-bis(4-cyanatophenyl)-2-methylpentane, 2,2-bis(4-cyanatophenyl)-1,1,1,3,3,3-hexafluoropropane, 1,3-bis[2-(4-cyanatophenyl)-2-propyl]benzene, bis(4-cyanatophenyl)ether, bis(4-cyanatophenyl)sulfide, 1,1-bis(4-cyanatophenyl)cyclopentane, and 1,1-bis(4-cyanatophenyl)cyclohexane are preferable, and bis(4-cyanatophenyl)methane, 2,4'-dicyanatodiphenylmethane, 1,1-bis(4-cyanatophenyl)ethane, 2,2-bis(4-cyanatophenyl)propane, 1,1-bis(4-cyanatophenyl)-2-methylpropane, 2,2-bis(4-cyanatophenyl)butane, 2,2-bis(4-cyanatophenyl)-4-methylpentane, 2,2-bis(4-cyanatophenyl)-1,1,1,3,3,3-hexafluoropropane, 1,3-bis[2-(4-cyanatophenyl)-2-propyl]benzene, bis(4-cyanatophenyl)ether, bis(4-cyanatophenyl)sulfide, and 1,1-bis(4-cyanatophenyl)cyclohexane are particularly preferable.

Examples of the cyanate ester compound represented by the general formula (V) include conventionally known naphthol aralkyl-based cyanate resins. Among them, a cyanate ester compound in which $R^{15}$ in the formula is a hydrogen atom or a methyl group can be suitably used.

Examples of the cyanate ester compound represented by the general formula (VI) include a conventionally known phenol novolac-based cyanate resin, cresol novolac-based cyanate resin, and phenol aralkyl-based cyanate resin. Among them, the phenol novolac-based cyanate resin and the cresol novolac-based cyanate resin are preferable, and the phenol novolac-based cyanate resin is particularly preferable. The cyanate ester compounds (D) represented by the above general formulae (IV) to (VI) may be used singly or in the form of a mixture of two or more.

The content of the cyanate ester compound (D) is preferably in the range of from 1 to 250 parts by mass based on 100 parts by mass of the cyanate ester compound (A). The heat resistance and water absorbability of the cured product can be further improved by using the cyanate ester compound (D) in the range in combination.

The curable resin composition according to the present invention may contain an epoxy resin (E). A commonly known compound having two or more epoxy groups per molecule can be used as the epoxy resin (E). Examples thereof include a bisphenol A-based epoxy resin, a bisphenol F-based epoxy resin, a phenol novolac-based epoxy resin, a cresol novolac-based epoxy resin, a bisphenol A novolac-based epoxy resin, a brominated bisphenol A-based epoxy resin, a brominated phenol novolac-based epoxy resin, a trifunctional phenol-based epoxy resin, a tetrafunctional phenol-based epoxy resin, a naphthalene-based epoxy resin, an anthracene-based epoxy resin, a biphenyl-based epoxy resin, a phenol aralkyl-based epoxy resin, a biphenyl aralkyl-based epoxy resin, a naphthol aralkyl-based epoxy resin, an alicyclic epoxy resin, a polyol-based epoxy resin, a phosphorus-containing epoxy resin, glycidyl amine, glycidyl ester, a compound obtained by epoxidation of a double bond of butadiene or the like, and a compound obtained by a reaction of a hydroxyl group-containing silicone resins with epichlorohydrin. Among them, the bisphenol A-based epoxy resin, the bisphenol F-based epoxy resin, the phenol novolac-based epoxy resin, the cresol novolac-based epoxy resin, the brominated bisphenol A-based epoxy resin, the brominated phenol novolac-based epoxy resin, the naphthalene-based epoxy resin, the anthracene-based epoxy resin, the biphenyl-based epoxy resin, the phenol aralkyl-based epoxy resin, the biphenyl aralkyl-based epoxy resin, the naphthol aralkyl-based epoxy resin, the alicyclic epoxy resin, the polyol-based epoxy resin, the phosphorus-containing epoxy resin, the glycidyl amine, and the glycidyl ester or the like are preferable, and the bisphenol A-based epoxy resin, the bisphenol F-based epoxy resin, the naphthalene-based epoxy resin, the anthracene-based epoxy resin, the dihydroxynaphthalene-based epoxy resin, the biphenyl-based epoxy resin, the phenol novolac-based epoxy resin, the phenol aralkyl-based epoxy resin, the biphenyl aralkyl-based epoxy resin, the naphthol aralkyl-based epoxy resin, and the alicyclic epoxy resin or the like are more preferable. These epoxy resins may be used singly or in the form of a mixture of two or more.

The content of the epoxy resin (E) is preferably in the range of from 1 to 250 parts by mass based on 100 parts by mass of the cyanate ester compound (A). The heat resistance and water absorbability of the cured product can be further improved by using the epoxy resin (E) in the range in combination.

The curable resin composition according to the present invention may contain a maleimide compound (F). A compound having one or more maleimide groups per molecule can be used as the maleimide compound (F) without particular limitation. Examples thereof include bismaleimide represented by the following general formula (VII), m-phenylene bismaleimide, 4-methyl-1,3-phenylene bismaleimide, 2,2'-bis-[4-(4-maleimidophenoxy)phenyl]propane, 1,6-bismaleimide-(2,2,4-trimethyl)hexane, polyphenylmethane maleimide, and N-phenyl maleimide.

[Formula 15]

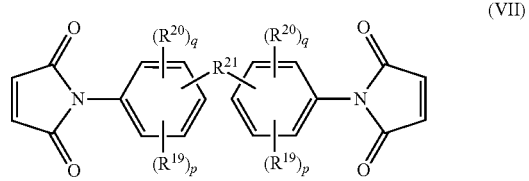

(VII)

wherein $R^{19}$ and $R^{20}$ each independently represent a hydrogen atom, a halogen atom, and an alkyl group having 1 to 3 carbon atoms; p+q=4 is set; and $R^{21}$ represents a single bond, an ether bond, a sulfide bond, a sulfone bond, an alkylene group having 1 to 5 carbon atoms, an alkylidene group, an arylene group having 6 to 14 carbon atoms, or an aryleneoxy group.

Examples of the bismaleimide represented by the general formula (VII) include 4,4'-diphenyl methane bismaleimide, 3,3'-dimethyl-5,5'-diethyl-4,4'-diphenyl methane bismaleimide, 4,4'-diphenyl ether bismaleimide, 4,4'-diphenyl sulfone bismaleimide, 1,3-bis(3-maleimidephenoxy)benzene, and 1,3-bis(4-maleimidophenoxy)benzene.

Among the above maleimide compounds, 4,4'-diphenyl methane bismaleimide, m-phenylene bismaleimide, 2,2'-bis-[4-(4-maleimidephenoxy)phenyl]propane, 3,3'-dimethyl-5,5'-diethyl-4,4'-diphenyl methane bismaleimide, and 4-methyl-1,3-phenylene bismaleimide or the like are preferable, and 4,4'-diphenyl methane bismaleimide, 2,2'-bis-[4-(4-maleimidophenoxy)phenyl]propane, and 3,3'-dimethyl-5,5'-diethyl-4,4'-diphenyl methane bismaleimide or the like are more preferable. Examples of the maleimide compound (F) include prepolymers of the above maleimide compounds, or a prepolymer of one of the maleimide compounds and an amine compound. These compounds and prepolymers may be used singly or in the form of a mixture of two or more as required.

The content of the maleimide compound (F) is preferably in the range of from 1 to 100 parts by mass based on 100 parts by mass of the cyanate ester compound (A). The casting property of the resin composition can be further improved by using the maleimide compounds (F) in the range in combination.

The curable resin composition according to the present invention may further contain a benzoxazine compound and/or a polymerizable unsaturated group-containing compound or the like in addition to the above cyanate ester compound (D), epoxy resin (E), and maleimide compound (F). A commonly known benzoxazine compound having two or more dihydrobenzoxazine rings per molecule can be used as the benzoxazine compound. Examples thereof include a benzoxazine compound described in Japanese Patent Laid-Open No. 2009-096874. These benzoxazine compounds may be used singly or in the form of a mixture of two or more.

Commonly known polymerizable unsaturated group-containing compound can be used as the polymerizable unsaturated group-containing compound. Examples thereof include vinyl compounds such as ethylene, propylene, styrene, divinylbenzene, and divinylbiphenyl; (meth)acrylates of mono- or polyhydric alcohols such as methyl(meth)acrylate, 2-hydroxyethyl(meth)acrylate, 2-hydroxypropyl (meth)acrylate, polypropylene glycol di(meth)acrylate, trimethylolpropane di(meth)acrylate, trimethylolpropane tri(meth)acrylate, pentaerythritol tetra(meth)acrylate, and dipentaerythritol hexa(meth)acrylate; epoxy(meth)acrylates such as bisphenol A-based epoxy(meth)acrylate and bisphenol F-based epoxy(meth)acrylate; and benzocyclobutene resins. These polymerizable unsaturated group-containing compounds may be used singly or in the form of a mixture of two or more.

The curable resin composition according to the present invention may further contain other polymerization catalysts in addition to the above catalyst. As the other polymerization catalysts, a polymerization catalyst having a function for catalyzing the polymerization of a cyanate ester, an epoxy resin, an oxetane resin, a benzoxazine compound, and a polymerizable unsaturated group-containing compound can be used without particular limitation. Examples of the polymerization catalysts include alcohols such as 1-butanol and 2-ethylhexanol; imidazole derivatives such as 2-methylimidazole, 2-ethyl-4-methylimidazole, 2-phenylimidazole, 1-cyanoethyl-2-phenylimidazole, 1-cyanoethyl-2-ethyl-4-methylimidazole, 2-phenyl-4,5-dihydroxymethylimidazole, and 2-phenyl-4-methyl-5-hydroxymethylimidazole; and a phosphine-based or phosphonium-based phosphorus compound. Epoxy-imidazole adduct compounds; peroxides such as benzoyl peroxide, p-chlorobenzoyl peroxide, di-t-butyl peroxide, diisopropyl peroxycarbonate, and di-2-ethylhexyl peroxycarbonate; or azo compounds such as azobisisobutyronitrile may be used. These polymerization catalysts may be commercial products. Examples thereof include Amicure PN-23 (manufactured by Ajinomoto Fine-Techno Co., Inc.), Novacure HX-3721 (manufactured by Asahi Kasei Corporation), and Fujicure FX-1000 (manufactured by Fuji Kasei Kogyo Co., Ltd.).

The curable resin composition according to the present invention may contain an inorganic filler. Examples of the inorganic filler include silicates such as talc, calcined clay, uncalcined clay, mica, and glass; oxides such as titanium oxide, alumina, silica, and fused silica; carbonates such as calcium carbonate, magnesium carbonate, and hydrotalcite; hydroxides such as aluminum hydroxide, magnesium hydroxide, and calcium hydroxide; sulfates or sulfites such as barium sulfate, calcium sulfate, and calcium sulfite;

borates such as zinc borate, barium metaborate, aluminum borate, calcium borate, and sodium borate; nitrides such as aluminum nitride, boron nitride, silicon nitride, and carbon nitride; and titanates such as strontium titanate and barium titanate. One of these may be used alone or two or more thereof may be used in combination. Among them, the silica is particularly preferable, and the fused silica is preferable in respect of an excellent low thermal expansibility. Although crushed and spherical silicas exist, the spherical silica is preferable in respect of lowering the melt viscosity of the resin composition.

The spherical silica may be further processed by a processing agent for previously performing a surface treatment. At least one compound selected from the group consisting of functional group-containing silanes, cyclic oligosiloxanes, organohalosilanes, and alkylsilazanes can be suitably used as the processing agent. Among them, the organohalosilanes and the alkylsilazanes are suitably used for the surface treatment of the spherical silica in order to make the surface of the silica hydrophobic and make the spherical silica in the curable resin composition preferable in respect of excellent dispersibility.

The functional group-containing silanes used as the above processing agent are not particularly limited. Examples thereof include epoxysilane compounds such as 3-glycidoxypropyltrimetoxysilane, 3-glycidoxypropyltriethoxysilane, 3-glycidoxypropylmethyldiethoxysilane, and 2-(3,4-epoxycyclohexyl)ethyldimethoxysilane; (meth)acrylsilanes such as 3-methacryloxypropyltrimethoxysilane, 3-methacryloxypropylmethyldimethoxysilane, 3-methacryloxypropyltriethoxysilane, and 3-methacryloxypropylmethyldiethoxysilane; mercaptosilanes such as 3-mercaptopropyltrimethoxysilane, 3-mercaptopropyltriethoxysilane, and 3-mercaptopropylmethyldimethoxysilane; vinylsilanes such as vinyltriethoxysilane, vinyltrimetoxysilane, and vinyltrichlorosilane; isocyanate silanes such as 3-isocyanatepropyltriethoxysilane; ureidosilanes such as 3-ureidopropyltrimethoxysilane and 3-ureidopropyltriethoxysilane; (5-norbornene-2-yl)alkylsilanes such as (5-norbornene-2-yl)trimethoxysilane, (5-norbornene-2-yl)triethoxysilane, and (5-norbornene-2-yl)ethyltrimethoxysilane; and phenylsilanes such as phenyltrimethoxysilane.

The curable resin composition according to the present invention may further contain a silicone resin powder. The silicone resin powder is a cured product powder having a structure in which siloxane bonds are crosslinked in a three-dimensional network manner represented by $(RSiO_{3/2})_n$. An average particle diameter of the powder is preferably 0.1 to 10 µm. Specific examples thereof include KMP-590 (manufactured by Shin-Etsu Silicone), KMP-701 (manufactured by Shin-Etsu Silicone), X-52-854 (manufactured by Shin-Etsu Silicone), X-52-1621 (manufactured by Shin-Etsu Silicone), XC99-B5664 (manufactured by Momentive Performance Materials Inc.), XC99-A8808 (manufactured by Momentive Performance Materials Inc.), and Tospearl 120 (manufactured by Momentive Performance Materials Inc.). The powders may be used singly or in the form of a mixture of two or more as required.

<Method for Producing Curable Resin Composition>

The curable resin composition according to the present invention can be obtained by mixing the above cyanate ester compound (A), metal complex catalyst (B), and additive (C), and the cyanate ester compound (D) represented by the general formulae (VI), (VII) and (VIII), the epoxy resin (E), the maleimide compound (F), and the benzoxazine compound and/or the polymerizable unsaturated group-containing compound or various additives if needed, with a solvent using known mixers such as a high-speed mixer, a Nauta mixer, a ribbon type blender, a kneader, an intensive mixer, a universal mixer, a dissolver, and a static mixer. A method for adding the cyanate ester compound, the various additives, and the solvent upon mixing is not particularly limited.

<Cured Product>

A cured product can be obtained by curing the curable resin composition according to the present invention by heat and light or the like. The cured product can be obtained by melting the curable resin composition or dissolving the curable resin composition in a solvent, thereafter filling the curable resin composition into a mold, and curing the curable resin composition under an ordinary condition. When a curing temperature is too low upon heat curing, the curing does not proceed. When the curing temperature is too high, the cured product is deteriorated. Therefore, the curing temperature is preferably in the range of 120 to 300° C.

<Application of Curable Resin Composition>

A prepreg can be produced by impregnating the above curable resin composition into the base material or coating the curable resin composition on the base material.

The base material of the prepreg is not particularly limited. Examples thereof include a glass fiber base material such as a glass woven fabric and a glass nonwoven fabric or the like; a synthesis fiber base material made of a woven fabric or nonwoven fabric consisting primarily of polyamide resin fibers such as a polyamide resin fiber, an aromatic polyamide resin fiber, and a wholly aromatic polyamide resin fiber, polyester resin fibers such as a polyester resin fiber, an aromatic polyester resin fiber, and a wholly aromatic polyester resin fiber, polyimide resin fibers, and fluorine resin fibers; and organic fiber base materials such as a paper base material consisting primarily of haft paper, cotton linter paper, and mixed paper of linter and kraft pulp. Thereby, the strength of the prepreg can be improved, the water absorption rate thereof can be decreased, and the coefficient of the thermal expansion thereof can be reduced.

Glass contained in the above glass fiber base material is not particularly limited. Examples thereof include E-glass, C-glass, A-glass, S-glass, D-glass, NE-glass, T-glass, and H-glass.

The method for producing the prepreg is not particularly limited. Examples thereof include a method for preparing a resin varnish using the epoxy resin composition described above and immersing a base material in the resin varnish; a method for coating the resin varnish using various coaters; and a method for spraying the resin varnish using a spray. Among them, the method for immersing the base material in the resin varnish is preferable. Thereby, the impregnation property of the resin composition to the base material can be improved. When the base material is immersed in the resin varnish, an ordinary impregnating coating apparatus may be used. For example, a method for impregnating a resin composition varnish into an inorganic fiber base material and/or an organic fiber base material, drying the inorganic fiber base material and/or the organic fiber base material, and putting the inorganic fiber base material and/or the organic fiber base material into a B stage to form the prepreg can be applied.

The curable resin composition according to the present invention may be used to produce a metal-clad laminated sheet and a multilayer sheet. A method for producing the laminated sheets or the like is not particularly limited. The laminated sheet can be obtained by subjecting the above prepreg and a metal foil to heating pressure molding with the prepreg and the metal foil superposed. Although a heating temperature is not particularly limited, the heating temperature is preferably 65 to 300° C., and particularly preferably 120 to 270° C. Although a pressurizing pressure is not particularly limited, the pressurizing pressure is preferably 2 to 5 MPa, and more preferably 2.5 to 4 MPa.

A sealing material can be produced using the curable resin composition according to the present invention. A method for producing the sealing material is not particularly limited. The sealing material can be obtained by mixing the above ingredients using a known mixer. A method for adding the cyanate ester compound, the various additives, and the solvent upon mixing is not particularly limited.

A fiber-reinforced composite material can be produced using the curable resin composition according to the present invention. Examples of a reinforced fiber include a carbon fiber, a glass fiber, an aramid fiber, a boron fiber, a PBO fiber, a high-strength polyethylene fiber, an alumina fiber, and a silicon carbide fiber. The form and arrangement of the reinforced fiber are not particularly limited, and may be suitably selected from a textile, a nonwoven fabric, a mat, a knit, a braid, an unidirectional strand, a roving, and a chopped strand or the like. A preform (one obtained by laminating woven base fabrics containing reinforced fibers, one obtained by integrally stitching the woven base fabrics by stitch threads, or a fiber structure such as a three-dimensional textile or a braided product) can also be applied as the form of the reinforced fiber. Specific examples of a method for producing the fiber-reinforced composite material include liquid composite molding methods, resin film infusion methods, filament winding methods, hand lay up methods, and pultrusion methods. Among them, in a resin transfer molding method which is one of the liquid composite molding methods, materials other than the preform such as a metal plate, a foam core, and a honeycomb core can be previously set in a forming die. Thereby, the resin transfer molding method can be adopted in various applications, and is suitably used when a composite material having a comparatively complicated shape is mass-produced in a short time.

Because the curable resin composition according to the present invention has an excellent low thermal expansibility, high heat resistance, and a low water absorbability, the curable resin composition is extremely useful as a highly-functional polymer material. The curable resin composition is preferably used for electrical insulating materials, sealing materials, adhesives, lamination materials, resists, and built-up laminated sheet materials as materials having excellent thermal, electrical, and mechanical properties. Additionally, the curable resin composition is preferably used for fixing materials, structural members, reinforcing agents, and mold materials or the like in the fields of civil engineering-construction, electric/electronic applications, automobiles, railways, ships, aircraft, sporting goods, and arts-crafts or the like. Among them, the curable resin composition is suitably used for electrical insulating materials, semiconductor sealing materials, adhesives for electronic parts, aircraft structural members, satellite structural members, and railway vehicle structural members which require a casting property, a low thermal expansibility, flame resistance, and a high mechanical strength.

EXAMPLES

Hereinafter, the present invention is described further specifically with reference to the following Examples, to which, however, the present invention should not be particularly limited.

Synthesis of Cyanate Ester Compound

Synthesis Example 1

Synthesis of bis(4-cyanatophenyl)phenylmethane (abbreviated as Bis-BA CN)

27.6 g (100 mmol) of bis(4-hydroxyphenyl)phenylmethane (manufactured by Wako Pure Chemical Industries, Ltd.) and 28.3 g (280 mmol) of triethylamine were dissolved in 100 mL of tetrahydrofuran (solution 1). At −10° C., the solution 1 was dropwise added to a mixed solution of a methylene chloride solution (46.2 g) of cyanogen chloride (18.4 g (300 mmol)) and tetrahydrofuran (100 mL), over 1.5 hours. After the completion of the reaction was confirmed, the reaction liquid was condensed. The obtained crude product was dissolved in 300 mL of methylene chloride. The obtained liquid was washed with 1 M hydrochloric acid and distilled water, and was then dried with anhydrous magnesium sulfate. The methylene chloride was distilled away to obtain 30.0 g of desired bis(4-cyanatophenyl)phenylmethane. The structure of the compound obtained as described above was identified by an NMR spectrum. The NMR spectrum was as shown in FIG. 1.

1H-NMR: (270 MHz, Chloroform-d, internal reference TMS)

δ (ppm) 5.59 (s, 1H), 7.04 (d, 2H), 7.06-7.36 (complex, 11H)

Synthesis Example 2

Synthesis of α,α-bis(4-cyanatophenyl)ethylbenzene (abbreviated as Bis-AP CN)

Figure 2:
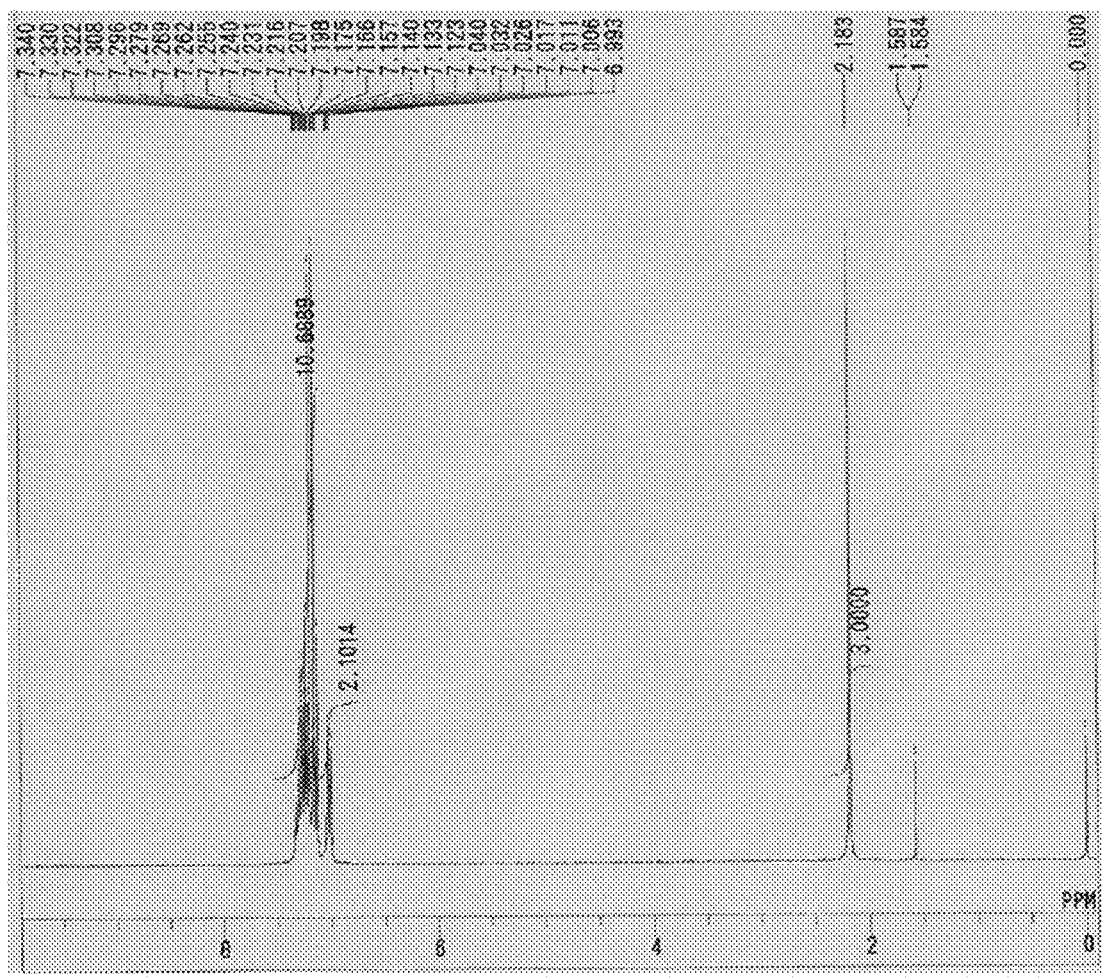
FIG. 2 is a $^1$H-NMR chart of α,α-bis(4-cyanatophenyl) ethylbenzene obtained in Synthesis Example 2.

23.1 g of α,α-bis(4-cyanatophenyl)ethylbenzene was obtained in the same manner as in Synthesis Example 1 except that α,α-bis(4-hydroxyphenyl)ethylbenzene (manufactured by Wako Pure Chemical Industries, Ltd.) was used in place of bis(4-hydroxyphenyl)phenylmethane. The structure of the compound obtained as described above was identified by an NMR spectrum. The NMR spectrum was as shown in FIG. 2.

1H-NMR: (270 MHz, Chloroform-d, internal reference TMS)

δ (ppm) 2.18 (s, 3H), 7.00 (d, 2H), 7.01-7.34 (complex, 11H)

Synthesis Example 3

Synthesis of bis(4-cyanatophenyl)ether (abbreviated as Bis-Ether CN)

Figure 3:
FIG. 3 is a $^1$H-NMR chart of bis(4-cyanatophenyl)ether obtained in Synthesis Example 3.

22.0 g of bis(4-cyanatophenyl)ether was obtained in the same manner as in Synthesis Example 1 except that bis(4-hydroxyphenyl)ether (manufactured by Tokyo Chemical Industry Co., Ltd.) was used in place of bis(4-hydroxyphenyl)phenylmethane. The structure of the compound obtained as described above was identified by an NMR spectrum. The NMR spectrum was as shown in FIG. 3.

1H-NMR: (270 MHz, Chloroform-d, internal reference TMS)

δ (ppm) 7.07 (d, 4H), 7.31 (d, 4H)

Synthesis Example 4

Synthesis of 1,3-bis[2-(4-cyanatophenyl)-2-propyl]benzene (abbreviated as Bis-M CN)

1,3-bis[2-(4-cyanatophenyl)-2-propyl]benzene was obtained based on a method described in Example 1 of Japanese Patent Laid-Open No. 4-221355.

Synthesis Example 5

Synthesis of 1,1-bis(4-cyanatophenyl)ethane (abbreviated as Bis-E CN)

Figure 4:
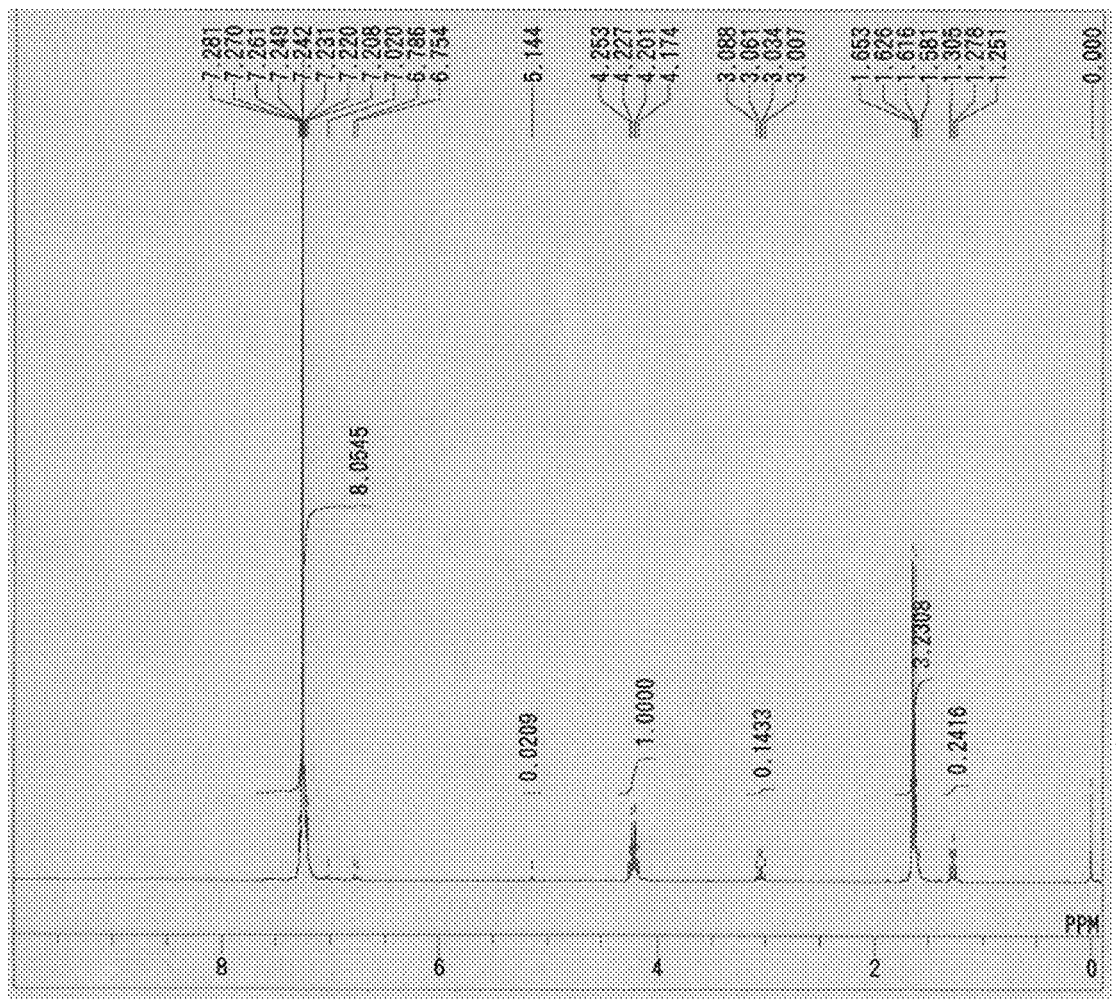
FIG. 4 is a $^1$H-NMR chart of 1,1-bis(4-cyanatophenyl) ethane obtained in Synthesis Example 5.

23.1 g of 1,1-bis(4-cyanatophenyl)ethane was obtained in the same manner as in Synthesis Example 1 except that 1,1-bis(4-hydroxyphenyl)ethane (manufactured by Wako Pure Chemical Industries, Ltd.) was used in place of bis(4-hydroxyphenyl)phenylmethane. The structure of the compound obtained as described above was identified by an NMR spectrum. The NMR spectrum was as shown in FIG. 4.

1H-NMR: (270 MHz, Chloroform-d, internal reference TMS)

δ (ppm) 1.62 (d, 3H), 4.22 (q, 1H), 7.42 (complex, 8H)

Synthesis Example 6

Synthesis of 1,1-bis(4-cyanatophenyl)isobutane (abbreviated as Bis-IB CN)

Figure 5:
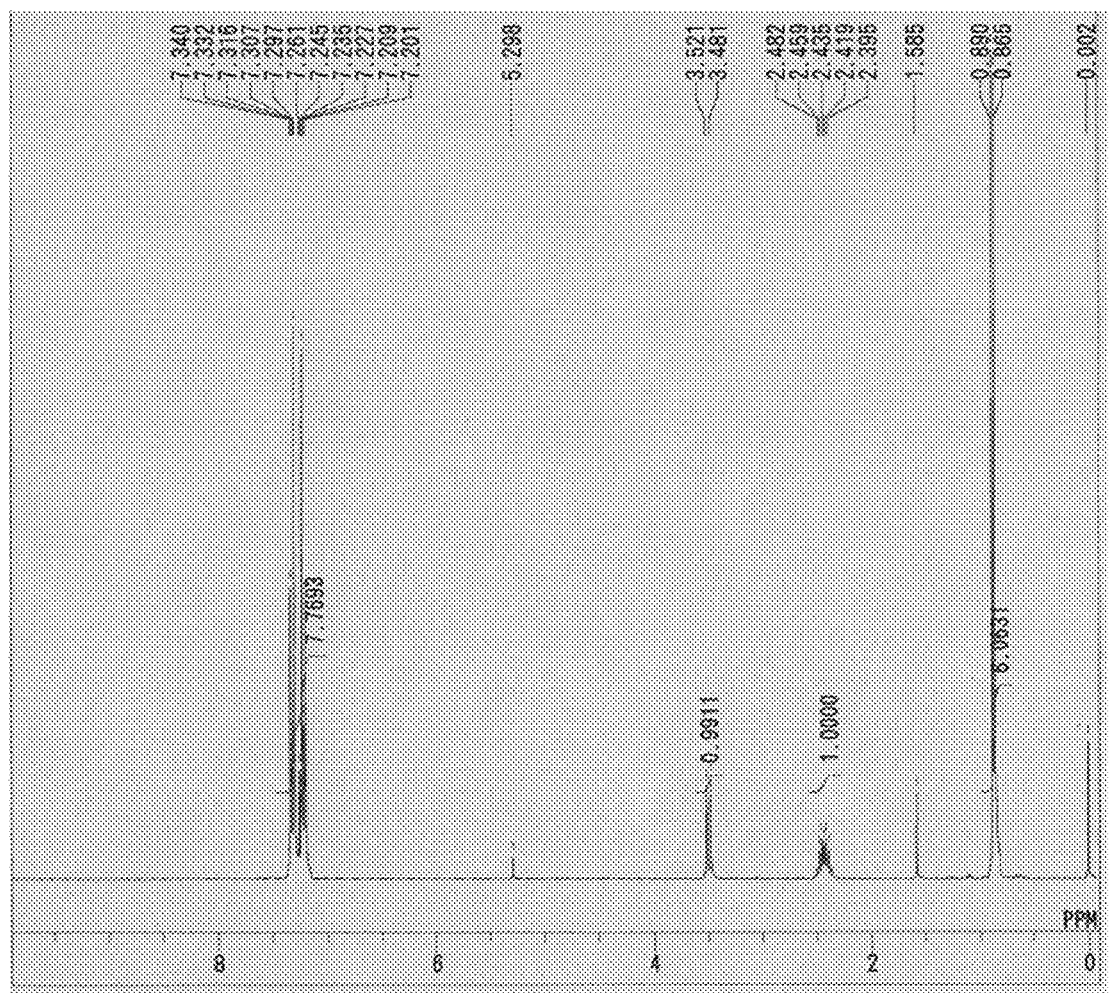
FIG. 5 is a $^1$H-NMR chart of 1,1-bis(4-cyanatophenyl) isobutane obtained in Synthesis Example 6.

28.3 g of 1,1-bis(4-cyanatophenyl)isobutane was obtained in the same manner as in Synthesis Example 1 except that 1,1-bis(4-hydroxyphenyl)isobutane (manufactured by Wako Pure Chemical Industries, Ltd.) was used in place of bis(4-hydroxyphenyl)phenylmethane. The structure of the compound obtained as described above was identified by an NMR spectrum. The NMR spectrum was as shown in FIG. 5.

1H-NMR: (270 MHz, Chloroform-d, internal reference TMS) δ (ppm) 0.88 (d, 6H), 2.41 (m, 1H), 3.51 (d, 1H), 7.20-7.35 (complex, 8H)

Synthesis Example 7

Synthesis of tris(4-cyanatophenyl)-1,1,1-methane (abbreviated as TRPCN)

Tris(4-cyanatophenyl)-1,1,1-methane was obtained from tris(4-hydroxyphenyl)-1,1,1-methane based on a method described in Synthesis Example of Japanese Patent Laid-Open No. 2006-290933.

Synthesis Example 8

Synthesis of 1,1,1-tris(4-cyanatophenyl)ethane (abbreviated as TRPECN)

Figure 6:
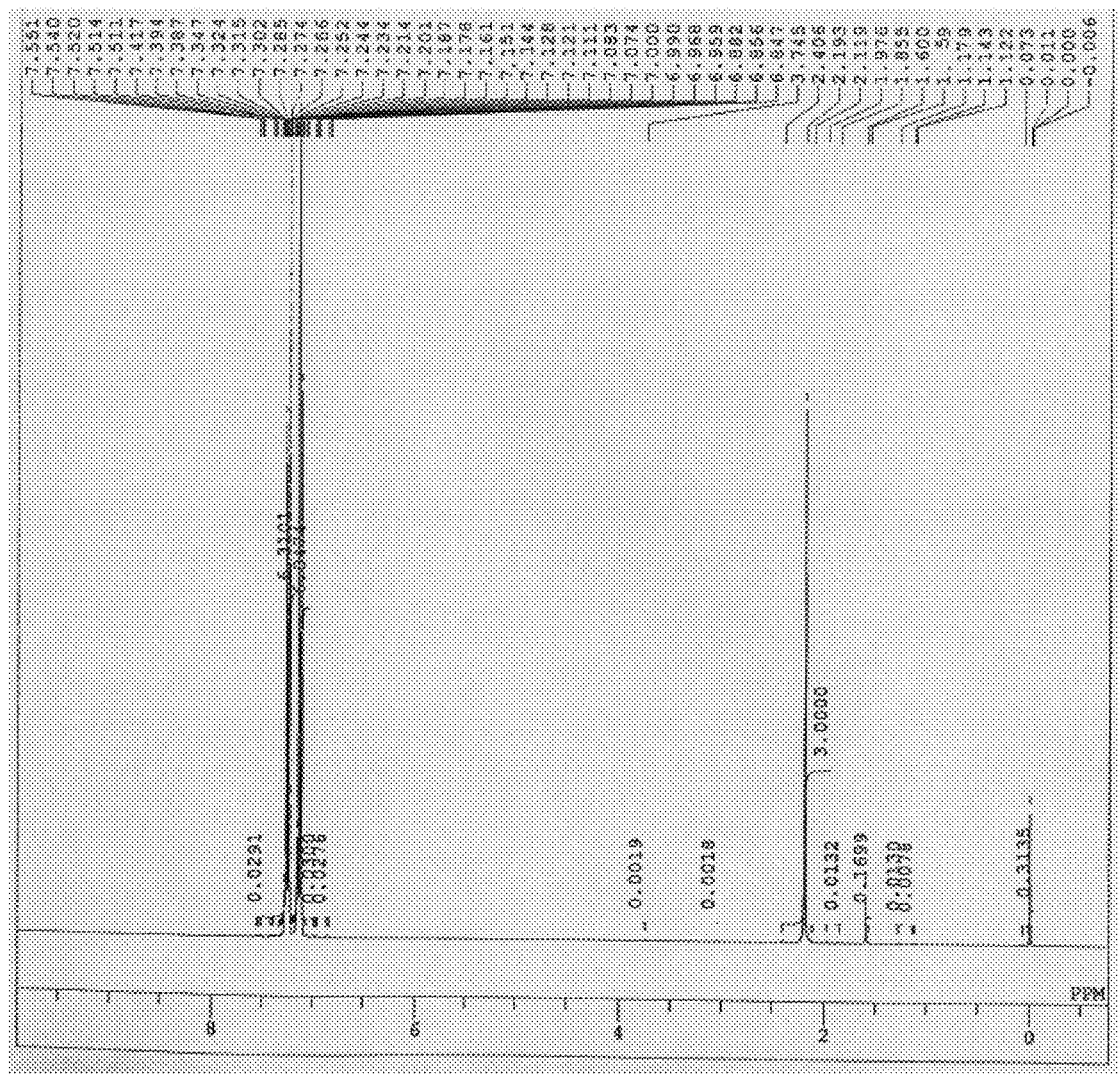
FIG. 6 is a $^1$H-NMR chart of 1,1,1-tris(4-cyanatophenyl) ethane obtained in Synthesis Example 8.

33.0 g of 1,1,1-tris(4-cyanatophenyl)ethane was obtained in the same manner as in Synthesis Example 1 except that 1,1,1-tris(4-hydroxyphenyl)ethane (manufactured by Wako Pure Chemical Industries, Ltd.) was used in place of bis(4-hydroxyphenyl)phenylmethane. The structure of the compound obtained as described above was identified by an NMR spectrum. The NMR spectrum was as shown in FIG. 6.

1H-NMR: (300 MHz, Chloroform-d, internal reference TMS)

δ (ppm) 2.19 (s, 3H), 7.13 (d, 6H), 7.26 (d, 6H)

Synthesis Example 9

Synthesis of naphthol aralkyl-based cyanate ester (abbreviated as SNCN)

Naphthol aralkyl-based cyanate ester was obtained from α-naphthol aralkyl resin based on a method described in Synthesis Example 1 of Japanese Patent Laid-Open No. 2006-193607.

Preparation of Curable Resin Composition

Example 1

100 parts by mass of Bis-BA CN obtained in Synthesis Example 1, 0.02 parts by mass of zinc octoate (manufactured by Nihon Kagaku Sangyo Co., Ltd., Nikka Octhix Zinc (trademark), metal content: 18%), and 1 part by mass of 4-nonylphenol (manufactured by Tokyo Chemical Industry Co., Ltd.) were heated and degassed via a vacuum pump to obtain a composition.

<Production of Cured Product>

The composition obtained as described above was reheated. The composition was cast into a mold formed of an aluminum plate (120 mm×120 mm×5 mm) and a PTFE plate, and was cured by heating in an oven at 250° C. for 4 hours, thereby obtaining a cured product having a side of 80 mm and a thickness of 2 mm.

Example 2

A cured product was obtained in the same manner as in Example 1 except that 1 part by mass of 1-naphthol was used in place of using 1 part by mass of 4-nonylphenol in Example 1.

Example 3

A cured product was obtained in the same manner as in Example 1 except that 1 part by mass of 1,6-dihydroxynaphthalene (manufactured by Wako Pure Chemical Industries, Ltd.) was used in place of using 1 part by mass of 4-nonylphenol in Example 1.

Example 4

A cured product was obtained in the same manner as in Example 1 except that 1 part by mass of 2,7-dihydroxynaphthalene (manufactured by Wako Pure Chemical Industries, Ltd.) was used in place of using 1 part by mass of 4-nonylphenol in Example 1.

Example 5

A cured product was obtained in the same manner as in Example 1 except that 2 parts by mass of 2,7-dihydroxynaphthalene (manufactured by Wako Pure Chemical Industries, Ltd.) was used in place of using 1 part by mass of 4-nonylphenol in Example 1.

Example 6

A cured product was obtained in the same manner as in Example 1 except that 0.5 parts by mass of tributylamine (manufactured by Wako Pure Chemical Industries, Ltd.) was used in place of using 1 part by mass of 4-nonylphenol in Example 1.

Example 7

A cured product was obtained in the same manner as in Example 1 except that 0.5 parts by mass of N,N-dimethylaminoethanol (manufactured by Mitsubishi Gas Chemical Co., Inc., abbreviated as DMAE) was used in place of using 1 part by mass of 4-nonylphenol in Example 1.

Example 8

A cured product was obtained in the same manner as in Example 1 except that 0.2 parts by mass of 4-dimethylaminopyridine (manufactured by Tokyo Chemical Industry Co., Ltd., abbreviated as DMAP) was used in place of using 1 part by mass of 4-nonylphenol in Example 1.

Example 9

A cured product was obtained in the same manner as in Example 1 except that 0.1 parts by mass of 1,8-diazabicyclo[5.4.0]-7-undecene (manufactured by Tokyo Chemical Industry Co., Ltd., abbreviated as DBU) was used in place of using 1 part by mass of 4-nonylphenol in Example 1.

Example 10

A cured product was obtained in the same manner as in Example 1 except that 1.5 parts by mass of nonylphenol and 0.5 parts by mass of 2,7-dihydroxynaphthalene were used in place of using 1 part by mass of 4-nonylphenol in Example 1.

Example 11

A cured product was obtained in the same manner as in Example 1 except that 1 part by mass of 4-nonylphenol was not used in Example 1.

Example 12

A cured product was obtained in the same manner as in Example 4 except that 85 parts by mass of Bis-BA CN and 15 parts by mass of 2,2-bis(4-cyanatophenyl)propane (manufactured by Mitsubishi Gas Chemical Co., Inc., abbreviated as Bis-A CN) were used in place of using 100 parts by mass of Bis-BA CN in Example 4.

Example 13

A cured product was obtained in the same manner as in Example 4 except that 70 parts by mass of Bis-BA CN and 30 parts by mass of Bis-Ether CN obtained in Synthesis Example 3 were used in place of using 100 parts by mass of Bis-BA CN in Example 4.

Example 14

A cured product was obtained in the same manner as in Example 4 except that 80 parts by mass of Bis-BA CN and 20 parts by mass of Bis-M CN obtained in Synthesis Example 4 were used in place of using 100 parts by mass of Bis-BA CN in Example 4.

Example 15

A cured product was obtained in the same manner as in Example 4 except that 50 parts by mass of Bis-BA CN and 50 parts by mass of Bis-IB CN obtained in Synthesis Example 6 were used in place of using 100 parts by mass of Bis-BA CN in Example 4.

Example 16

A cured product was obtained in the same manner as in Example 4 except that 65 parts by mass of Bis-BA CN, 25 parts by mass of Bis-IB CN obtained in Synthesis Example 6, and 10 parts by mass of a phenol novolac-based cyanate ester resin (manufactured by LONZA Japan, PRIMASET PT-15 (trademark), abbreviated as PT-15) were used in place of using 100 parts by mass of Bis-BA CN in Example 4.

Example 17

A cured product was obtained in the same manner as in Example 4 except that 80 parts by mass of Bis-BA CN and 20 parts by mass of a bisphenol A-based epoxy resin (manufactured by Mitsubishi Chemical Corporation, jER828 (trademark), abbreviated as DGEBA) were used in place of using 100 parts by mass of Bis-BA CN in Example 4; the amount of the zinc octoate added was changed from 0.02 parts by mass to 0.016 parts by mass; and a curing temperature in an oven was set to 200° C.

Example 18

A cured product was obtained in the same manner as in Example 4 except that 70 parts by mass of Bis-BA CN, 10 parts by mass of TRPCN obtained in Synthesis Example 7, 8 parts by mass of a cresol novolac-based epoxy resin (manufactured by DIC Corporation, Epiclon N-680 (trademark), abbreviated as ECN), and 12 parts by mass of a biphenyl aralkyl-based epoxy resin (Nippon Kayaku Co., Ltd., NC-3000 (trademark), abbreviated as NC-3000) were used in place of using 100 parts by mass of Bis-BA CN in Example 4; the amount of the zinc octoate added was changed from 0.02 parts by mass to 0.017 parts by mass; and a curing temperature in an oven was set to 200° C.

Example 19

A cured product was obtained in the same manner as in Example 4 except that 60 parts by mass of Bis-BA CN, 10 parts by mass of Bis-A CN, and 30 parts by mass of 4,4'-bismaleimide diphenyl methane (manufactured by Tokyo Chemical Industry Co., Ltd., abbreviated as BMI) were used in place of using 100 parts by mass of Bis-BA CN in Example 4; and the amount of the zinc octoate added was changed from 0.02 parts by mass to 0.014 parts by mass.

Example 20

A cured product was obtained in the same manner as in Example 4 except that 30 parts by mass of Bis-BA CN, 30 parts by mass of PT-15, 10 parts by mass of NC-3000, and 30 parts by mass of a maleimide compound (manufactured by K.I Chemical Industry Co., Ltd., BMI-70 (trademark)) were used in place of using 100 parts by mass of Bis-BA CN in Example 4; the amount of the zinc octoate was changed from 0.02 parts by mass to 0.012 parts by mass; and a curing temperature in an oven was set to 200° C.

Example 21

A cured product was obtained in the same manner as in Example 4 except that 60 parts by mass of Bis-BA CN, 10 parts by mass of Bis-E CN, and 30 parts by mass of SNCN obtained in Synthesis Example 9 were used in place of using 100 parts by mass of Bis-BA CN in Example 4.

Example 22

A cured product was obtained in the same manner as in Example 4 except that 100 parts by mass of Bis-AP CN obtained in Synthesis Example 2 was used in place of using 100 parts by mass of Bis-BA CN in Example 4.

Example 23

A cured product was obtained in the same manner as in Example 4 except that 100 parts by mass of Bis-A CN was used in place of using 100 parts by mass of Bis-BA CN in Example 4.

Example 24

A cured product was obtained in the same manner as in Example 4 except that 100 parts by mass of TRPCN obtained in Synthesis Example 7 was used in place of using 100 parts by mass of Bis-BA CN in Example 4.

Example 25

A cured product was obtained in the same manner as in Example 4 except that 100 parts by mass of TRPECN obtained in Synthesis Example 8 was used in place of using 100 parts by mass of Bis-BA CN in Example 4.

Example 26

A cured product was obtained in the same manner as in Example 4 except that 100 parts by mass of PT-15 was used in place of using 100 parts by mass of Bis-BA CN in Example 4.

Example 27

A cured product was obtained in the same manner as in Example 4 except that 65 parts by mass of Bis-A CN and 35 parts by mass of Bis-E CN obtained in Synthesis Example 5 were used in place of using 100 parts by mass of Bis-BA CN in Example 4.

Example 28

A cured product was obtained in the same manner as in Example 4 except that 40 parts by mass of Bis-M CN obtained in Synthesis Example 4, 30 parts by mass of Bis-E CN obtained in Synthesis Example 5, and 30 parts by mass of SNCN obtained in Synthesis Example 9 were used in place of using 100 parts by mass of Bis-BA CN in Example 4.

Example 29

A cured product was obtained in the same manner as in Example 4 except that 50 parts by mass of Bis-Ether CN obtained in Synthesis Example 3 and 50 parts by mass of ECN were used in place of using 100 parts by mass of Bis-BA CN in Example 4; the amount of the zinc octoate added was changed from 0.02 parts by mass to 0.01 parts by mass; and a curing temperature in an oven was set to 200° C.

Example 30

A cured product was obtained in the same manner as in Example 4 except that 70 parts by mass of Bis-A CN and 30 parts by mass of BMI were used in place of using 100 parts by mass of Bis-BA CN in Example 4; and the amount of the zinc octoate added was changed from 0.02 parts by mass to 0.014 parts by mass.

Example 31

A cured product was obtained in the same manner as in Example 4 except that 70 parts by mass of Bis-A CN and 30 parts by mass of a bisphenol F-based epoxy resin (manufactured by Mitsubishi Chemical Corporation, jER806 (trademark), abbreviated as DGEBF) were used in place of using 100 parts by mass of Bis-BA CN in Example 4; the amount of the zinc octoate added was changed from 0.02 parts by mass to 0.014 parts by mass; and a curing temperature in an oven was set to 200° C.

Example 32

A cured product was obtained in the same manner as in Example 4 except that 80 parts by mass of Bis-A CN and 20 parts by mass of DGEBA were used in place of using 100 parts by mass of Bis-BA CN in Example 4; the amount of the zinc octoate added was changed from 0.02 parts by mass to 0.016 parts by mass; and a curing temperature in an oven was set to 200° C.

Example 33

A cured product was obtained in the same manner as in Example 4 except that 30 parts by mass of Bis-A CN, 30 parts by mass of PT-15, 10 parts by mass of NC-3000, and 30 parts by mass of BMI-70 were used in place of using 100 parts by mass of Bis-BA CN in Example 4; the amount of the zinc octoate added was changed from 0.02 parts by mass to 0.016 parts by mass; and a curing temperature in an oven was set to 200° C.

Example 34

A cured product was obtained in the same manner as in Example 4 except that 60 parts by mass of Bis-A CN, 10 parts by mass of Bis-E CN obtained in Synthesis Example 5, and 30 parts by mass of SNCN obtained in Synthesis Example 9 were used in place of using 100 parts by mass of Bis-BA CN in Example 4.

<Evaluation of Cured Products>

Moldability, a glass transition temperature, a coefficient of linear expansion, and a water absorption rate of the cured products obtained as described above were measured as follows.

(1) Evaluation of Moldability

As for the moldability, the appearances of the obtained cured products (40 mm×40 mm×2 mm) were observed, and the existence or nonexistence of generation of cracks was visually confirmed. The determination reference was as follows.
OK: the generation of the cracks was not recognized.
NG: the generation of the cracks was recognized.
(2) Measurement of Glass Transition Temperature The glass transition temperature was measured in accordance with JIS-K7244-7-2007. Dynamic viscoelasticity measurement was conducted using a dynamic viscoelasticity measuring device (AR2000 manufactured by TA Instruments) on measurement conditions of a start temperature of 100° C., an end temperature of 400° C., a temperature increase rate of 3° C./min, and a measurement frequency of 1 Hz. The maximum value of loss tangent (tan δ) obtained at that time was defined as the glass transition temperature.
(3) Measurement of Coefficient of Linear Expansion The coefficient of linear expansion was measured in accordance with JIS-K-7197-1991. A test piece (5 mm×5 mm×2 mm) was set in a thermomechanical analyzer (TMA/SS7100 manufactured by SII NanoTechnology Inc.). Thermomechanical analysis was conducted in an expansion/compression mode on measurement conditions of a start temperature of 100° C., an end temperature of 300° C., a temperature increase rate of 5° C./min, and a load of 0.05 N, to measure an average thermal expansion amount per ° C. at a predetermined temperature. Average coefficients of linear expansion at 200° C. to 300° C. were measured in Examples other than Examples 17, 18, 20, 29, 31, 32, and 33. Average coefficients of linear expansion at 150° C. to 250° C. were measured in Examples 17, 18, 20, 29, 31, 32, and 33.
(4) Measurement of Water Absorption Rate The weight increase rate of a test piece (40 mm×40 mm×2 mm) immersed in boiling water for 300 hours was calculated, and the obtained value was defined as the water absorption rate.

The measurement results were as shown in the following Tables 1 to 3. The units of numerical values in Table 1 are represented by part by mass. Portions described as "-" in Table 1 mean that the relevant materials are not blended. In the glass transition temperature (Tg) in Table 1, ">400" means that the maximum peak value of tan δ is not clear within a measurement temperature range (25° C. to 400° C.) and Tg cannot be confirmed within the range.

TABLE 1

| resin compositions | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| cyanate ester | Bis-BA CN | 100 | 100 | 100 | 100 | 100 | 100 | 100 | 100 | 100 | 100 | 100 |
| metal complex catalyst | zinc octoate | 0.02 | 0.02 | 0.02 | 0.02 | 0.02 | 0.02 | 0.02 | 0.02 | 0.02 | 0.02 | 0.02 |
| additives | 4-nonylphenol | 1.0 | — | — | — | — | — | — | — | — | 1.5 | — |
| | 1-naphthol | — | 1.0 | — | — | — | — | — | — | — | — | — |
| | 1,6-dihydroxynaphthalene | — | — | 1.0 | — | — | — | — | — | — | — | — |
| | 2,7-dihydroxynaphthalene | — | — | — | 1.0 | 2.0 | — | — | — | — | 0.5 | — |
| | tributylamine | — | — | — | — | — | 0.5 | — | — | — | — | — |
| | DMAE | — | — | — | — | — | — | 0.5 | — | — | — | — |
| | DMAP | — | — | — | — | — | — | — | 0.2 | — | — | — |
| | DBU | — | — | — | — | — | — | — | — | 0.1 | — | — |
| evaluation results | casting property | OK | OK | OK | OK | OK | OK | OK | OK | OK | OK | NG |
| | Tg (° C.) | >400 | >400 | >400 | >400 | >400 | >400 | >400 | >400 | >400 | >400 | >400 |
| | coefficient of linear expansion (ppm/° C.) | 49 | 48 | 55 | 56 | 58 | 55 | 56 | 50 | 64 | 62 | 49 |
| | water absorption rate (%) | 1.3 | 1.3 | 1.3 | 1.4 | 1.5 | 1.4 | 1.4 | 1.3 | 1.3 | 1.6 | 1.3 |

TABLE 2

| resin compositions | | Example 12 | Example 13 | Example 14 | Example 15 | Example 16 | Example 17 | Example 18 | Example 19 | Example 20 | Example 21 |
|---|---|---|---|---|---|---|---|---|---|---|---|
| cyanate esters | Bis-BA CN | 85 | 70 | 80 | 50 | 65 | 80 | 70 | 60 | 30 | 60 |
| | Bis-AP CN | — | — | — | — | — | — | — | — | — | — |
| | Bis-A CN | 15 | — | — | — | — | — | — | 10 | — | — |
| | Bis-Ether CN | — | 30 | — | — | — | — | — | — | — | — |
| | Bis-M CN | — | — | 20 | — | — | — | — | — | — | — |
| | Bis-E CN | — | — | — | — | — | — | — | — | — | 10 |
| | Bis-IB CN | — | — | — | 50 | 25 | — | — | — | — | — |
| | TRPCN | — | — | — | — | — | — | 10 | — | — | — |
| | TRPECN | — | — | — | — | — | — | — | — | — | — |
| | SNCN | — | — | — | — | — | — | — | — | — | 30 |
| | PT-15 | — | — | — | — | 10 | — | — | — | 30 | — |
| epoxy resins | DGEBA | — | — | — | — | — | 20 | — | — | — | — |
| | DGEBF | — | — | — | — | — | — | — | — | — | — |
| | ECN | — | — | — | — | — | — | 8 | — | — | — |
| | NC-3000 | — | — | — | — | — | — | 12 | — | 10 | — |
| maleimide compounds | BMI | — | — | — | — | — | — | — | 30 | — | — |
| | BMI-70 | — | — | — | — | — | — | — | — | 30 | — |
| metal complex catalyst | zinc octoate | 0.02 | 0.02 | 0.02 | 0.02 | 0.02 | 0.016 | 0.017 | 0.014 | 0.012 | 0.02 |
| additives | 2,7-dihydroxynaphthalene | 1.0 | 1.0 | 1.0 | 1.0 | 1.0 | 1.0 | 1.0 | 1.0 | 1.0 | 1.0 |

TABLE 2-continued

| resin compositions | | Example 12 | Example 13 | Example 14 | Example 15 | Example 16 | Example 17 | Example 18 | Example 19 | Example 20 | Example 21 |
|---|---|---|---|---|---|---|---|---|---|---|---|
| evaluation results | casting property | OK | OK | OK | OK | OK | OK | OK | OK | OK | OK |
| | Tg (° C.) | >400 | >400 | >400 | >400 | >400 | 253 | 343 | >400 | 292 | >400 |
| | coefficient of linear expansion (ppm/° C.) | 55 | 71 | 95 | 66 | 97 | 95 | 62 | 64 | 84 | 76 |
| | water absorption rate (%) | 1.5 | 1.5 | 1.2 | 1.6 | 1.7 | 1.8 | 1.7 | 1.8 | 1.9 | 1.5 |

TABLE 3

| resin compositions | | Example 22 | Example 23 | Example 24 | Example 25 | Example 26 | Example 27 | Example 28 | Example 29 | Example 30 | Example 31 | Example 32 | Example 33 | Example 34 |
|---|---|---|---|---|---|---|---|---|---|---|---|---|---|---|
| cyanate esters | Bis-BA CN | — | — | — | — | — | — | — | — | — | — | — | — | — |
| | Bis-AP CN | 100 | — | — | — | — | — | — | — | — | — | — | — | — |
| | Bis-A CN | — | 100 | — | — | — | 65 | — | — | 70 | 70 | 80 | 30 | 60 |
| | Bis-Ether CN | — | — | — | — | — | — | — | 50 | — | — | — | — | — |
| | Bis-M CN | — | — | — | — | — | — | 40 | — | — | — | — | — | — |
| | Bis-E CN | — | — | — | — | — | 35 | 30 | — | — | — | — | — | 10 |
| | Bis-IB CN | — | — | — | — | — | — | — | — | — | — | — | — | — |
| | TRPCN | — | — | 100 | — | — | — | — | — | — | — | — | — | — |
| | TRPECN | — | — | — | 100 | — | — | — | — | — | — | — | — | — |
| | SNCN | — | — | — | — | — | — | 30 | — | — | — | — | — | 30 |
| | PT-15 | — | — | — | — | 100 | — | — | — | — | — | — | 30 | — |
| epoxy resins | DGEBA | — | — | — | — | — | — | — | — | — | — | 20 | — | — |
| | DGEBF | — | — | — | — | — | — | — | — | — | 30 | — | — | — |
| | ECN | — | — | — | — | — | — | — | 50 | — | — | — | — | — |
| | NC-3000 | — | — | — | — | — | — | — | — | — | — | — | 10 | — |
| maleimide compounds | BMI | — | — | — | — | — | — | — | — | 30 | — | — | — | — |
| | BMI-70 | — | — | — | — | — | — | — | — | — | — | — | 30 | — |
| metal complex catalyst | zinc octoate | 0.02 | 0.02 | 0.02 | 0.02 | 0.02 | 0.02 | 0.02 | 0.01 | 0.014 | 0.014 | 0.016 | 0.016 | 0.02 |
| additives | 2,7-dihydroxy-naphthalene | 1.0 | 1.0 | 1.0 | 1.0 | 1.0 | 1.0 | 1.0 | 1.0 | 1.0 | 1.0 | 1.0 | 1.0 | 1.0 |
| evaluation results | casting property | OK | OK | OK | OK | OK | OK | OK | OK | OK | OK | OK | OK | OK |
| | Tg (° C.) | 301 | 307 | >400 | >400 | 298 | 298 | 232 | 286 | 304 | 211 | 250 | 292 | 292 |
| | coefficient of linear expansion (ppm/° C.) | 94 | 88 | 40 | 46 | 85 | 97 | 239 | 181 | 64 | 169 | 147 | 92 | 127 |
| | water absorption rate (%) | 1.3 | 2.0 | 2.6 | 2.5 | 2.6 | 2.1 | 1.9 | 2.1 | 2.2 | 2.2 | 2.5 | 2.5 | 1.9 |

The invention claimed is:

1. A curable resin composition comprising:
at least a cyanate ester compound (A) represented by the following formula (I):

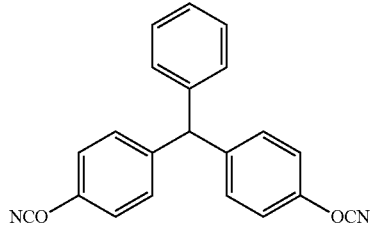

(I)

a metal complex catalyst (B); and
an additive (C), wherein the additive (C) a compound represented by the following general formula (III):

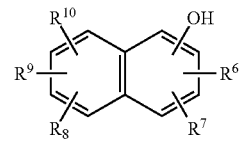

(III)

wherein $R^6$ to $R^{10}$ each independently represent a hydrogen atom, an alkyl group having 1 to 4 carbon atoms, an alkoxy group having 1 to 4 carbon atoms, an aryl group having 6 to 15 carbon atoms, or a hydroxy group; and
an amount of the cyanate ester compound (A) is 60 to 100 weight % based on total amount of cyanate ester compounds.

2. The curable resin composition according to claim 1, further comprising one or more selected from the group consisting of:
a cyanate ester compound (D) represented by the following general formula (IV):

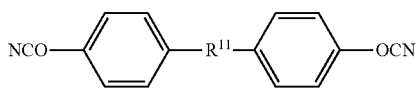

wherein $R^{11}$ is any one selected from the group consisting of the following general formulae (i) to (vi):

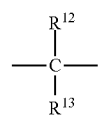

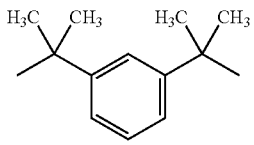

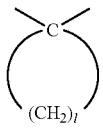

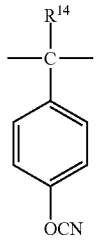

wherein $R^{12}$, $R^{13}$, and $R^{14}$ are each independently a hydrogen atom, an alkyl group having 1 to 8 carbon atoms, or a trifluoromethyl group, and l is an integer of 4 to 7,
the following general formula (V):

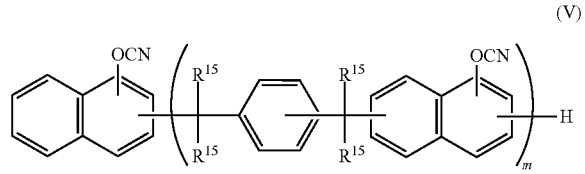

wherein $R^{15}$ represents a hydrogen atom or a methyl group, and m represents an integer of 1 to 50, or the following general formula (VI):

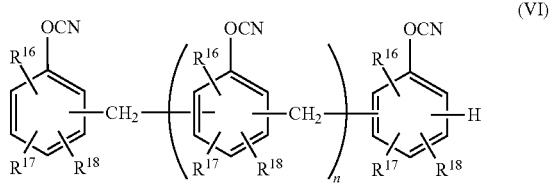

wherein $R^{16}$ to $R^{18}$ are each independently a hydrogen atom, a methyl group, an ethyl group, a propyl group, a butyl group, or a phenyl group, and n represents an integer of 1 to 50;
an epoxy resin (E); and
a maleimide compound (F).

3. The curable resin composition according to claim 2, wherein the epoxy resin (E) is one or more selected from the group consisting of a bisphenol A-based epoxy resin, a bisphenol F-based epoxy resin, a naphthalene-based epoxy resin, an anthracene-based epoxy resin, a dihydroxynaphthalene-based epoxy resin, a biphenyl-based epoxy resin, a phenol novolac-based epoxy resin, a phenol aralkyl-based epoxy resin, a biphenyl aralkyl-based epoxy resin, a naphthol aralkyl-based epoxy resin, and an alicyclic epoxy resin.

4. The curable resin composition according to claim 2, wherein the maleimide compound (F) is a compound represented by the following general formula (VII):

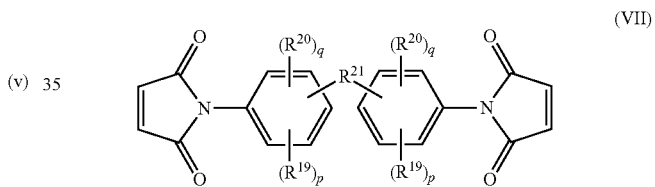

wherein
$R^{19}$ and $R^{20}$ each independently represent a hydrogen atom, a halogen atom, or an alkyl group having 1 to 3 carbon atoms;
p+q=4 is set; and
$R^{21}$ represents a single bond, an ether bond, a sulfide bond, a sulfone bond, an alkylene group having 1 to 5 carbon atoms, an alkylidene group, an arylene group having 6 to 14 carbon atoms, or an aryleneoxy group.

5. The curable resin composition according to claim 4, wherein the maleimide compound (F) is at least one selected from the group consisting of 4,4'-diphenyl methane bismaleimide, 2,2'-bis-[4-(4-maleimidephenoxy)phenyl]propane, and 3,3'-dimethyl-5,5'-diethyl-4,4'-diphenyl methane bismaleimide.

6. The curable resin composition according to claim 2, wherein the curable resin composition comprises 1 to 250 parts by mass of the cyanate ester compound (D) based on 100 parts by mass of the cyanate ester compound (A).

7. The curable resin composition according to claim 2, wherein the curable resin composition comprises 1 to 250 parts by mass of the epoxy resin (E) based on 100 parts by mass of the cyanate ester compound (A).

8. The curable resin composition according to claim 2, wherein the curable resin composition comprises 1 to 100 parts by mass of the maleimide compound (F) based on 100 parts by mass of the cyanate ester compound (A).

9. The curable resin composition according to claim 1, wherein the metal complex catalyst (B) is one or more selected from the group consisting of an octoate, a naphthenate, and an acetylacetone complex of manganese, iron, cobalt, nickel, copper, or zinc.

10. The curable resin composition according to claim 1, wherein the additive (C) is one or more selected from the group consisting of 1 naphthol, 2-naphthol, and dihydroxynaphthalene.

11. The curable resin composition according to claim 1, wherein the curable resin composition comprises 0.01 to 5 parts by mass of the metal complex catalyst (B) based on 100 parts by mass of the cyanate ester compound (A).

12. The curable resin composition according to claim 1, wherein the curable resin composition comprises 0.01 to 10 parts by mass of the additive (C) based on 100 parts by mass of the cyanate ester compound (A).

13. A cured product obtained by curing the curable resin composition according to claim 1.

14. A sealing material comprising the curable resin composition according to claim 1.

15. An adhesive comprising the curable resin composition according to claim 1.

16. A casting material comprising the curable resin composition according to claim 1.

17. A prepreg comprising: a base material; and the curable resin composition according to claim 1 impregnated into or coated on the base material.

18. A laminated sheet obtained by stacking at least one prepreg according to claim 17, disposing a metal foil on one side or both sides of the prepreg or the stacked prepregs, and laminate-molding the metal foil and the prepreg or the stacked prepregs.

* * * * *

UNITED STATES PATENT AND TRADEMARK OFFICE
CERTIFICATE OF CORRECTION

PATENT NO. : 9,657,173 B2  
APPLICATION NO. : 13/978310  
DATED : May 23, 2017  
INVENTOR(S) : M. Tsubuku et al.

Page 1 of 1

It is certified that error appears in the above-identified patent and that said Letters Patent is hereby corrected as shown below:

In the Claims

Column 29, Claim 10, Line 3 please change "of 1 naphthol" to -- of 1-naphthol --

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*